No. 647,262. Patented Apr. 10, 1900.
W. HAY.
OPERATING MECHANISM FOR MOTOR VEHICLES.
(Application filed Aug. 14, 1899.)

(No Model.) 4 Sheets—Sheet 1.

No. 647,262. Patented Apr. 10, 1900.
W. HAY.
OPERATING MECHANISM FOR MOTOR VEHICLES.
(Application filed Aug. 14, 1899.)

(No Model.) 4 Sheets—Sheet 3.

No. 647,262. Patented Apr. 10, 1900.
W. HAY.
OPERATING MECHANISM FOR MOTOR VEHICLES.
(Application filed Aug. 14, 1899.)
(No Model.) 4 Sheets—Sheet 4.
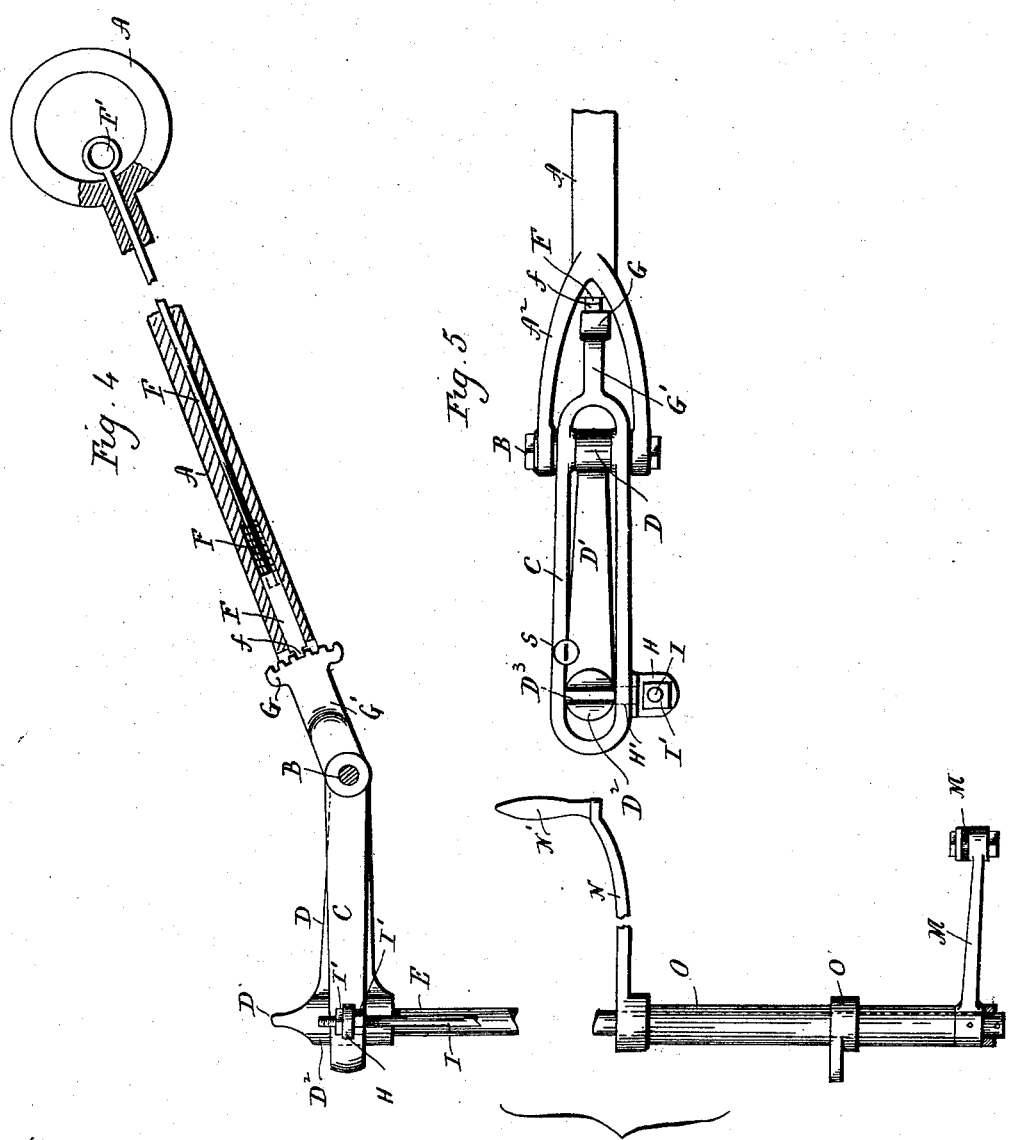
Witnesses. Walter Hay, Inventor.
By Attys Seymour & Earle
THE NORRIS PETERS CO., PHOTO-LITHO., WASHINGTON, D. C.

UNITED STATES PATENT OFFICE.

WALTER HAY, OF NEW HAVEN, CONNECTICUT, ASSIGNOR TO EMERSON M. HOTCHKISS, OF WATERBURY, CONNECTICUT.

OPERATING MECHANISM FOR MOTOR-VEHICLES.

SPECIFICATION forming part of Letters Patent No. 647,262, dated April 10, 1900.

Application filed August 14, 1899. Serial No. 727,143. (No model.)

*To all whom it may concern:*

Be it known that I, WALTER HAY, of New Haven, in the county of New Haven and State of Connecticut, have invented a new Improvement in Operating Mechanism for Motor-Vehicles; and I do hereby declare the following, when taken in connection with the accompanying drawings and the letters of reference marked thereon, to be a full, clear, and exact description of the same, and which said drawings constitute part of this specification, and represent, in—

Figure 1:
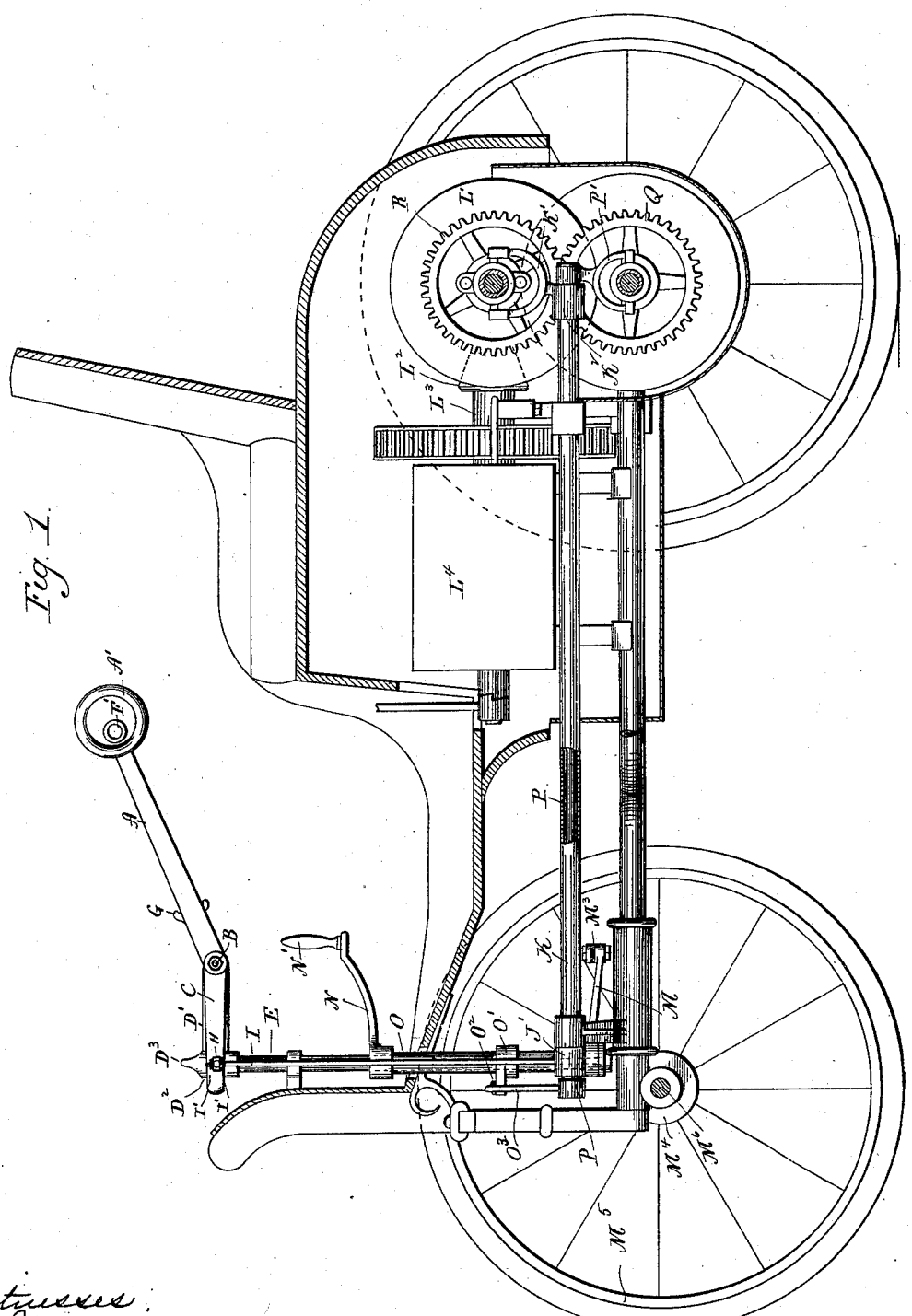
Figure 2:
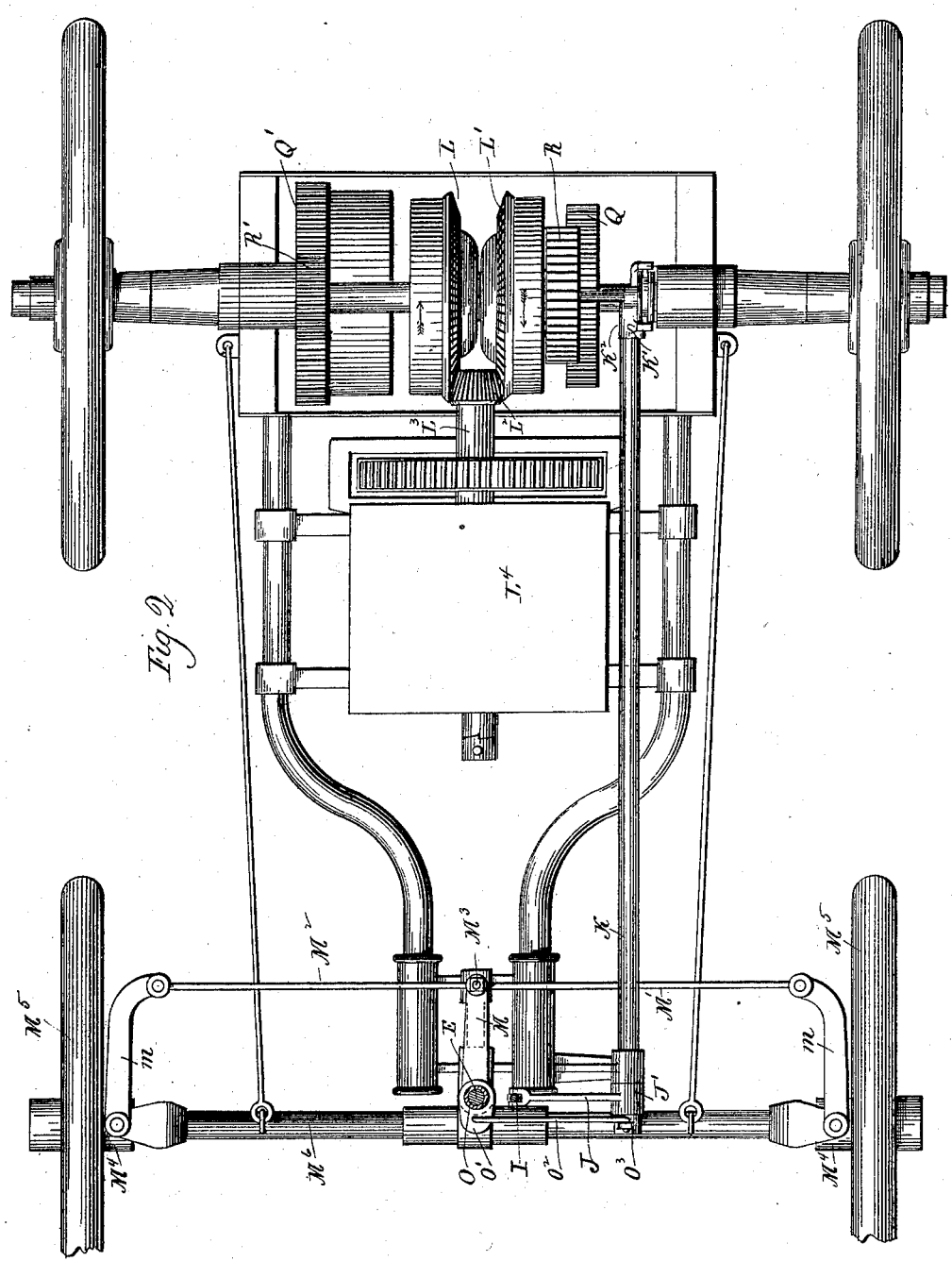
Figure 3:
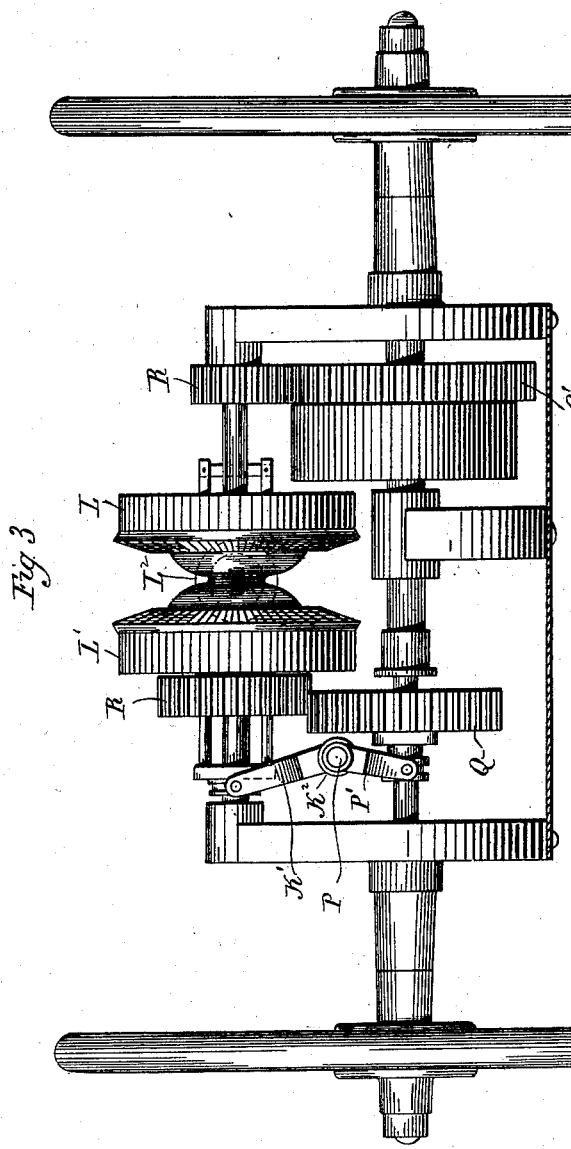

Figure 1, a view, partly in side elevation and partly in vertical section, of a motor-vehicle provided with operating mechanism constructed in accordance with my invention; Fig. 2, a plan view of the vehicle with the upper end of the steering-post broken away; Fig. 3, a view of the vehicle in rear elevation with its driving and hill-climbing mechanisms exposed; Fig. 4, a detached broken view showing the handle-lever, the operating-lever, the hill-climbing handle-lever, the steering-post, and some of their related devices; Fig. 5, a plan view of the handle and operating levers.

My invention relates to an improvement in operating mechanism for motor-vehicles, the object being to improve them in convenience and safety by providing them with superior steering and controlling devices.

With these ends in view my invention consists in an improved combined steering and controlling hand-lever, in connections between the said lever and the driving and steering mechanism of the vehicle, in a hill-climbing handle-lever, in connections between the said lever and the hill-climbing mechanism of the vehicle, and in certain other details of construction, as will be hereinafter described, and pointed out in the claims.

In carrying out my invention, as herein shown, I employ a combined steering and controlling handle-lever A, formed at its rear end with a ring-shaped handle A', located in a vertical plane. At its forward end this lever is provided with a fork A², the ends of which are perforated for the reception of a pivot B, which also passes through the rear portion of a skeleton operating-lever C, as well as through a bearing D, formed at the rear end of a horizontal arm D', rigidly connected with the upper end of the steering-post E and located within the said skeleton operating-lever. The said handle-lever A is adjustably coupled with the said operating-lever C, which may in one sense be considered as merely an extension of the handle-lever, by means of a longitudinally-movable rod F, located within the handle-lever, which is longitudinally chambered for the purpose. At its rear end the rod is formed with a finger-piece F', located within the forward portion of the ring-shaped handle A', in convenient position to be engaged with and operated by the fingers of the hand clasping the said handle. At its forward end the rod is provided with an independently-formed plunger-like dog F², which projects into the crotch formed by the arms of the fork A², as clearly shown in Fig. 5, the said projecting end of the dog being formed with a tooth $f$, adapted to be engaged with the teeth of a vertically-arranged segmental rack G, projecting rearward into the fork from the rear end of the skeleton operating-lever C, with which the rack is connected by means of an arm or reach G', also located within the fork, which receives the rear end of the operating-lever. A spring F³, located within the handle-lever A and encircling the rod F, is arranged to engage with the dog F², so as to exert a constant effort to keep the tooth $f$ in engagement with the rack G. I may here mention that, if preferred, the coupling-rod F may be located outside of the handle-lever in suitable bearings and that the rod F and dog F² may be made in one piece, if desired. It will be understood that when the handle-lever and operating-lever are coupled together as described the depression or elevation of the handle-lever causes both levers to be rocked virtually as though they were in one piece upon the pivot B as a center, whereby the forward end of the operating-lever is raised and lowered with respect to the upper end of the steering-post E, which may be said to act as a guide for the forward end of the operating-lever as it is thus raised and lowered. At its forward end and upon one side the operating-lever is provided with a small bracket H, which is formed with a central perforation for the upward passage through it of a vertically-arranged connecting-rod I, which is adjustably connected with the bracket by means of two check-nuts I' I', located above and below the same and providing for the vertical adjustment of the rod with respect to the bracket, whereby the range of adjustment provided by the rack G is supplemented. In order to accommodate the position of the bracket to the changing positions of the operating-lever, it is swiveled thereto upon a pivot H', as seen in Fig. 5.

At its forward end the arm D' is formed with a head $D^2$, terminating at its upper end in a rest $D^3$, which provides for the support of the handle-lever A when the same is uncoupled from the rack G and swung forward out of the way to permit the occupants of the front seat of the vehicle convenient ingress and egress. For this purpose the handle-lever is very readily uncoupled from the rack G by the retraction of the coupling-rod by means of its finger-piece F'.

At its lower end the connecting-rod I is flexibly connected in any desired manner—as, for instance, by means of the fork and pivot shown—with the end of a lever-arm J, formed upon a hub J', rigidly secured to the forward end of a horizontally-arranged tubular rock-shaft K, supported in suitable bearings and extending to the rear end of the vehicle, where the shaft is provided with an upwardly-extending fork-shaped clutch-operating arm K', formed at its lower end with a hub $K^2$, by means of which it is rigidly connected with the shaft K. The clutch operated by this arm K' may be of any approved construction—such, for instance, as shown in my pending application filed June 17, 1899, and serially numbered 720,894. I do not, however, limit myself to the employment of such a clutch mechanism. The clutch mechanism, whatever its character may be, is virtually interposed between the said arm and the forward and reverse driving mechanism of the vehicle. That mechanism may also be of any approved form and does not need detailed description here; but I may identify the forward driving-gear L and the reversing-gear L'. As shown in Fig. 3 the arm K' has operated the clutch so as to drive the vehicle forward. I should say that, as shown in my prior application referred to, the clutch mechanism is of the friction type and constructed so that the speed of the vehicle in driving forward or in reversing is controlled by the amount of power applied to the clutch. In other words, the speed is proportional to the power applied to the clutch, and as the clutch is controlled, through the connections described, by the handle-lever A it follows that the speed of the vehicle in being driven forward will be proportional to the amount of power applied to the handle-lever in pulling it downward, while, on the other hand, the speed of the vehicle in being reversed will be proportional to the amount of power applied to lifting the handle-lever.

The large gears L and L' are driven, as may be here explained, in opposite directions, as indicated by the arrows placed upon them, by means of a beveled pinion $L^2$, mounted upon the rear of the motor-shaft $L^3$ of the motor, which may be of any approved character and which is not shown, but which may be understood to be inclosed in the case or box $L^4$.

I have described the controlling of the vehicle in speed and in its proportional forward or back movement by upward or downward pressure applied to the handle-lever, the lateral movement of which to the right or left is utilized for steering the vehicle. With that end in view the lower end of the steering-post E is provided with a rearwardly-extending steering-arm M, Fig. 4, to which the inner ends of two steering connecting-rods M' $M^2$ are flexibly connected in any suitable manner—as, for instance, by means of a pivot $M^3$, as shown, or by a connection of the ball-and-socket type. The outer ends of the rods M' $M^2$ are connected through the arms $m$ $m$ with the pivotal hubs $M^4$ $M^4$ of the forward wheels $M^5$ $M^5$, the said hubs $M^4$ being pivotally connected with the forward axle $M^6$ of the vehicle. I do not enter upon the detailed construction of the hubs, because that construction is well known and I hold myself at liberty to employ any desired form of it.

In order to adapt the vehicle for hill-climbing, at which time speed is sacrificed for power, I employ a hill-climbing handle-lever N, located directly below the combined steering and controlling handle-lever A already described. This lever N is provided with a handle N' and rigidly secured to the upper end of a tubular shaft O, which is mounted for oscillation upon the lower portion of the steering-post E and which at its lower end rests upon the hub-like inner end of the steering-arm M, as shown in Fig. 4. This shaft is provided with a forwardly-extending bracket O', connected by a hill-climbing connecting-rod $O^2$ with the upper end of a lever $O^3$, the lower end of which is rigidly connected with the forward end of a solid rock-shaft P, located within the tubular rock-shaft K before described. The projecting rear end of the said solid rock-shaft is furnished with a fork-shaped clutch-operating arm P', which actuates a clutch suitable for cutting the normal gear-wheel Q and the hill-climbing gear-wheel Q' into and out of operation, the normal wheel Q meshing into the normal driving-wheel R and the hill-climbing wheel Q' meshing into the hill-climbing pinion R'. It will be understood, of course, that the difference in the number of teeth in the wheel R and in the pinion R' will represent the sacrifice of speed for power in driving the vehicle through the pinion R' instead of through the wheel R. Any approved clutch mechanism may be employed in conjunction with the arm P' and with the hill-climbing mechanism, which includes the wheels Q and Q', as stated.

I now wish to call particular attention to the fact that the entire control of my improved vehicle, both as to steering, speeding, reversing, and hill-climbing, is centered in two handle-levers located directly in front of the driver of the vehicle and both within his convenient and easy reach and manipulation. Both of these levers are centrally located, which makes them more convenient than if they were located off to one side or separate from each other. Moreover, the location of the hill-climbing lever upon a tubular shaft arranged concentrically with the steering-post secures compactness and simplicity of construction.

For the purpose of making the vehicle inoperative in the absence of the driver I may provide it with a lock, which may be of any suitable form, such as a key-lock or a combination-lock. As shown, I have indicated a combination-lock S, designed to lock the operating-lever C to the arm D' in the intermediate position of the former, for when the said lever is in that position the clutches are also in their intermediate positions and not in engagement for driving the vehicle.

Having fully described my invention, what I claim as new, and desire to secure by Letters Patent, is—

1. In operating mechanism for motor-vehicles, the combination with a steering-post, of a combined steering and controlling handle-lever pivotally connected with the upper end of the said post, an operating-lever forming an extension of the handle-lever, means for coupling the two levers together for their operation in unison, and operating connections connected with the operating-lever.

2. In operating mechanism for motor-vehicles, the combination with a steering-post formed at its upper end with a rearwardly-extending arm, of a handle-lever pivotally connected at its forward end with the rear end of the said arm, an operating-lever pivotally connected with the said arm upon the same center as the said handle-lever, means for adjustably coupling the two levers, and operating connections connected with the forward end of the operating-lever.

3. In operating mechanism for motor-vehicles, the combination with a steering-post having a rearwardly-extending arm, of a handle-lever pivotally connected with the rear end of the said arm, a skeleton operating-lever pivotally connected at its rear end with the rear end of the said arm, which is located within it, means for coupling the two levers together, and operating connections connected with the forward end of the operating-lever.

4. In operating mechanism for motor-vehicles, the combination with a steering-post having a rearwardly-extending arm, of a handle-lever pivotally connected with the said arm, an operating-lever pivotally connected at its rear end with the said arm, operating connections connected with the said operating-lever, and means including a rack and dog for adjustably coupling the two levers.

5. In operating mechanism for motor-vehicles, a vertically and laterally movable handle-lever formed at its rear end with a ring-shaped handle, in combination with means extending into the said handle for maintaining the lever in any desired position of vertical adjustment.

6. In operating mechanism for motor-vehicles, the combination with a vertically and laterally movable handle-lever provided at its rear end with a ring-shaped handle, of means for holding the said lever in any desired position of vertical adjustment, including a finger-piece located within the said ring-shaped handle.

7. In operating mechanism for motor-vehicles, the combination with a laterally and vertically movable handle-lever provided at its forward end with a fork, of an operating-lever pivotally mounted upon the same center as the said handle-lever, and provided with a rack extending into the fork thereof, operating connections connected with the said operating-lever, and a coupling-rod coacting at its forward end with the said rack to couple the two levers together with the handle-lever in any desired position of vertical adjustment, and adapted at its rear end to be manually operated for being disengaged from and reengaged with the said rack.

8. In operating mechanism for motor-vehicles, the combination with a steering-post provided with a rearwardly-extending arm, of a handle-lever pivotally connected with the rear end of the said arm, an operating-lever pivotally mounted upon the same center as the handle-lever, and provided with a rack, and a coupling-rod located within the handle-lever, extending rearward therein for manual operation, and extending forward for coaction with the rack, whereby the two levers are adapted to be coupled together with the handle-lever in any desired position of elevation with respect to the operating-lever.

9. In operating mechanism for motor-vehicles, the combination with a steering-post provided with a rearwardly-extending arm, of a handle-lever formed at its forward end with a fork through which it is pivotally connected with the rear end of the said arm, a skeleton operating-lever embracing the said arm, and at its rear end pivotally connected therewith on the same center as the fork of the handle-lever, and means operated from the rear end of the handle-lever for adjustably coupling the same with the operating-lever, whereby the handle-lever is supported in any desired position of elevation with respect to the operating-lever.

10. In operating mechanism for motor-vehicles, the combination with a steering-post provided with a rearwardly-extending arm, of a combined steering and controlling handle-lever pivotally connected with the rear end of the said arm, and adapted to be swung forward and supported through the upper end of the steering-post for convenient ingress into or egress from the vehicle.

11. In operating mechanism for motor-vehicles, the combination with a steering-post, of a rearwardly-extending arm applied to the upper end thereof, and formed at its forward end with a head containing a handle-lever rest, of a handle-lever pivotally connected with the rear end of the said arm, an operating-lever pivotally connected at its rear end with the said arm upon the same center as the handle-lever, operating connections with the operating-lever, and means for adjustably coupling the handle-lever and the operating-lever together for their operation as one piece, and for the disconnection of the handle-lever from the operating-lever, whereby the handle-lever may be swung forward and supported by the said handle-lever rest.

12. In operating mechanism for motor-vehicles, the combination with the steering-post thereof, of a handle-lever pivotally connected with the upper end of the said post, an operating-lever adjustably connected with the handle-lever by means of which it is operated, mechanism for driving the vehicle forward and back, and connections between the said mechanism and the said operating-lever including a vertically-movable connecting-rod, and a horizontally-arranged rock-shaft connected at its forward end with the said rod, and at its rear end with the said mechanism.

13. In operating mechanism for motor-vehicles, the combination with the driving mechanism thereof, of hill-climbing mechanism organized with the said driving mechanism, a steering-post, a handle-lever connected with the upper end of the steering-post, steering mechanism connected with the lower end of the post which is operated for actuating the said mechanism by moving the said handle-lever laterally, connection between the said lever and the driving mechanism, which is controlled by raising and lowering the said lever, a hollow shaft mounted upon the said post for oscillation thereupon, a hill-climbing handle-lever connected with the upper end of the said shaft, and located below the said handle-lever, means for cutting the hill-climbing mechanism into and out of operation, and connection between the lower end of the said oscillating shaft and the said means.

14. In operating mechanism for motor-vehicles, the combination with the steering-post thereof, of a handle-lever pivotally connected with the upper end of the said post, a tubular rock-shaft, connection between the said lever and the forward end of the said shaft, whereby the same is rocked as the handle is raised or lowered, clutch mechanism between the rear end of the said shaft and the driving mechanism of the vehicle, whereby the driving mechanism is cut into and out of operation, a hill-climbing handle-lever located beneath the lever above mentioned, a tubular shaft encircling the said steering-post and oscillated thereupon by the said hill-climbing lever, an inner rock-shaft located within the said tubular rock-shaft, and connected at its forward end with the lower end of the said shaft encircling the steering-post, hill-climbing mechanism organized with the driving mechanism of the vehicle, and means connected with the rear end of the said inner shaft and the said hill-climbing mechanism for cutting the same into and out of operation.

15. In operating mechanism for motor-vehicles, the combination with a steering-post having a rearwardly-extending arm located at its upper end, of a combined steering and controlling handle-lever pivotally connected with the said arm, an operating-lever pivotally connected with the said arm, upon the same center as the said handle-lever, means for coupling the said levers together, driving mechanism, connections between the said operating-lever and the driving mechanism whereby the same is cut into and out of operation by the vertical movement of the handle-lever, and a lock applied to one of the said levers for locking the same to the arm of the steering-post, whereby the vehicle is prevented from being operated.

In testimony whereof I have signed this specification in the presence of two subscribing witnesses.

WALTER HAY.

Witnesses:
GEORGE DUDLEY SEYMOUR,
LILLIAN D. KELSEY.